(12) United States Patent
Laamanen et al.

(10) Patent No.: US 7,864,776 B2
(45) Date of Patent: Jan. 4, 2011

(54) METHOD AND EQUIPMENT FOR MAKING A ROUTING DECISION DEPENDENT ON A QUALITY-OF-SERVICE CLASS

(75) Inventors: Heikki Laamanen, Espoo (FI); Vesa Hokkanen, Helsinki (FI)

(73) Assignee: Tellabs Oy, Espoo (FI)

( * ) Notice: Subject to any disclaimer, the term of this patent is extended or adjusted under 35 U.S.C. 154(b) by 547 days.

(21) Appl. No.: 11/605,413

(22) Filed: Nov. 29, 2006

(65) Prior Publication Data

US 2007/0124496 A1 May 31, 2007

(30) Foreign Application Priority Data

Nov. 30, 2005 (FI) .................................. 20051222

(51) Int. Cl.
*H04L 12/28* (2006.01)
(52) U.S. Cl. .................................. 370/395.31; 370/409
(58) Field of Classification Search .................. None
See application file for complete search history.

(56) References Cited

U.S. PATENT DOCUMENTS

| | | | | |
|---|---|---|---|---|
| 5,930,259 | A * | 7/1999 | Katsube et al. ............. | 370/409 |
| 6,085,238 | A * | 7/2000 | Yuasa et al. ................. | 709/223 |
| 6,088,356 | A * | 7/2000 | Hendel et al. ............... | 370/392 |
| 6,195,355 | B1 * | 2/2001 | Demizu ....................... | 370/397 |
| 6,212,184 | B1 * | 4/2001 | Venkatachary et al. ...... | 370/392 |
| 6,256,300 | B1 * | 7/2001 | Ahmed et al. ............... | 370/331 |
| 6,563,798 | B1 | 5/2003 | Cheng | |
| 2002/0071389 | A1 * | 6/2002 | Seo ............................. | 370/232 |
| 2002/0122422 | A1 * | 9/2002 | Kenney et al. ............... | 370/392 |
| 2002/0146009 | A1 * | 10/2002 | Gupta et al. ................. | 370/392 |
| 2003/0118029 | A1 * | 6/2003 | Maher et al. ............. | 370/395.21 |
| 2003/0123446 | A1 * | 7/2003 | Muirhead et al. ............ | 370/392 |
| 2003/0152028 | A1 * | 8/2003 | Raisanen et al. ............. | 370/235 |
| 2004/0008687 | A1 * | 1/2004 | Matsubara ............. | 370/395.21 |
| 2004/0165591 | A1 * | 8/2004 | Conte et al. .................. | 370/392 |
| 2004/0165597 | A1 * | 8/2004 | Bicknell et al. ......... | 370/395.31 |
| 2004/0174883 | A1 * | 9/2004 | Johansson et al. ...... | 370/395.31 |
| 2005/0030949 | A1 * | 2/2005 | Shirakawa et al. ........... | 370/392 |

OTHER PUBLICATIONS

Yang Xu et al., 'A Scalable 10Gb/s Line-Rate Router with DiffServ Support', Communication Technology Proceedings, 2003. ICCT 2003, International Conference on Apr. 9-11, 2003, Piscataway, NJ, USA, IEEE, kappale IV C.

* cited by examiner

*Primary Examiner*—Jayanti K Patel
*Assistant Examiner*—Hooman Houshmand
(74) *Attorney, Agent, or Firm*—Young & Thompson

(57) ABSTRACT

A method and equipment for obtaining routing data for a data transfer packet is presented. The data transfer packet is associated with information indicating a quality-of-service class of the data transfer packet and is related to protocol data associated with a data transfer protocol being used. The method using the protocol data as an input quantity for reading basic data and a reduction rule that are compatible with a routing table and the protocol data, using the information indicating the quality-of-service class as an input quantity of the reduction rule for obtaining auxiliary routing data, and obtaining the routing data on the basis of the basic data and the auxiliary routing data. The reduction rule connects auxiliary data to each quality-of-service class in such a way that each auxiliary data is associated with at least two different quality-of-service classes in order to reduce the amount of required storage capacity.

26 Claims, 7 Drawing Sheets

METHOD AND EQUIPMENT FOR MAKING A ROUTING DECISION DEPENDENT ON A QUALITY-OF-SERVICE CLASS

SCOPE OF INVENTION

The invention relates to a method and equipment for making a routing decision in packet-switched data communications when the quality-of-service class of the data transfer packet to be routed influences the routing decision to be made.

BACKGROUND OF INVENTION

In packet-switched data communication systems it is often advantageous that the data transfer packets to be transferred are classified as belonging to different quality-of-service classes (CoS, Class of Service) according to the kind of requirements the applications using the data communications service have and, on the other hand, according to the kind of agreements (SLA, Service Level Agreement) on the service quality that the data communications service provider has made with its customers using data communications services. For example, concerning a telephone application, such as an Internet call, it is essential that the data transfer speed required by the application is available for the time required, that the data transfer delay is sufficiently small, and that the variation of the transfer delay is sufficiently small. In a telephone application it is not useful that the data transfer speed provided for the application could be momentarily increased when the load in the data transfer network is reduced. Instead, for example when uploading a web site, it is extremely advantageous if even a momentarily free capacity of the data transfer network can be efficiently utilized.

Figure 1:
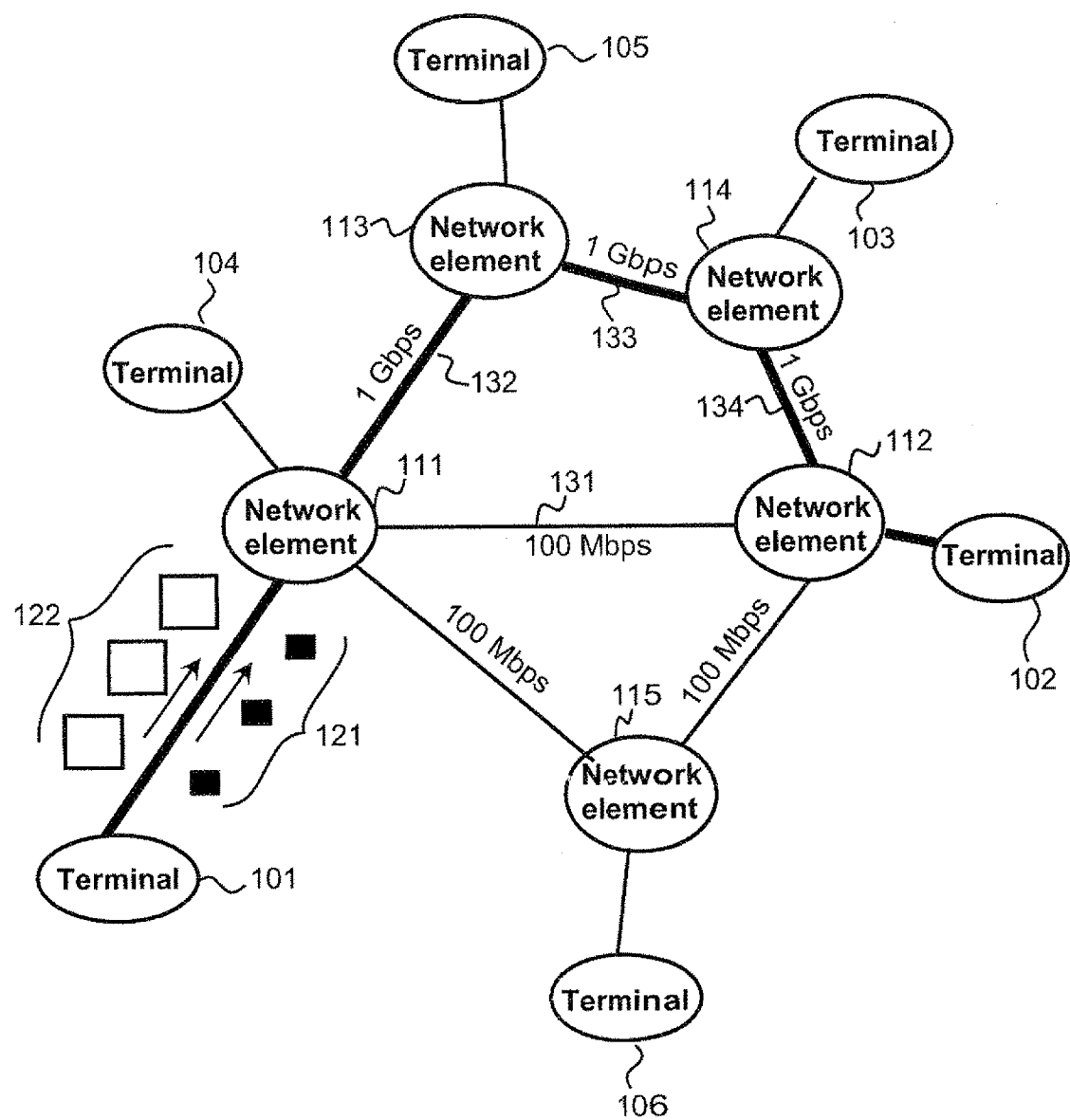

It is often advantageous that the data transfer packets arrived at a certain network element or the data transfer packets created in this network element, which are heading towards the same destination but represent different quality-of-service classes, are transferred to said destination via different routes. The information of quality-of-service class identifying the quality-of-service class can be included in the data transfer packet that arrives at the network element controlling the traffic, or said quality-of-service class can be created in said network element based on the packet classification. In connection with the IP networks (IP, Internet Protocol), the term 'router' is generally used for the network element controlling the traffic. For illustrating the background of the invention, FIG. 1 shows an exemplifying packet-switched data transfer network, which comprises terminal devices 101-106 and traffic controlling network elements 111-115. The terminal device 101 sends data transfer packets 121 and 122 directed to the terminal device 102 to the data transfer network. The data transfer packets 121 belong to the quality-of-service class CoS1 and represent a delay-critical traffic flow, which requires a low transfer capacity, for example 64 Kbit/s. The data transfer packets 122 belong to the quality-of-service class CoS2 and represent a traffic flow which is not delay-critical but requires a notably higher transfer capacity, for example 100 Mbit/s. In this exemplifying situation, the destination address related to the data transfer packets 121 is the address of the terminal device 102 and the information of quality-of-service is the information identifying the quality-of-service class CoS1. Correspondingly, the destination address related to the data transfer packets 121 is the address of the terminal device 102 and the information of quality-of-service is the information identifying the quality-of-service class CoS2. In such a situation it is worthwhile routing the data transfer packets 121 from the network element 111 to the network element 112 via a transfer link 131, because in this case the route between the terminal devices 101 and 102 has as few delay-causing network elements as possible and, on the other hand, the data transfer capacity of 100 Mbit/s of the link 131 is well sufficient for very many simultaneous traffic flows of 64 Kbit/s. It is worthwhile routing the data transfer packets 122 from the network element 111 to the network element 112 via transfer links 132, 133 and 134, of which each has a data transfer capacity of 1 Gbit/s, because in this case the data transfer capacity of the route between the terminal devices 101 and 102 is as high as possible. In the network element 111, a routing decision is made which identifies the data transfer link to be used in forwarding the data transfer packet. The routing decision can be made separately for each packet (packet-by-packet forwarding) or the same routing decision can be used for more than one packet directed to the same destination and representing the same quality-of-service class (stateful forwarding). Said routing decision depends on both the destination address (DA) related to the data transfer packet and the quality-of-service class that this data transfer packet represents.

In addition to the routing decision related to forwarding of the data transfer packet, it is also possible to create verification data related to a security measure. Said security measure (RAL, Reverse Address Lookup) is used to verify whether the data transfer packet has arrived from such an area of the data transfer network that corresponds to the source address (SA) indicated in this data transfer packet. The verification data related to the security measure is created in a similar way as the routing decision but using the source address instead of the destination address. Said security measure can be used to prevent such hostile network attacks which have been implemented with data transfer packets having an untrue source address indicated in them. The verification data related to the security measure can also depend, besides on the source address, on the quality-of-service class represented by the data transfer packet.

Later in this document, both the routing decision related to forwarding and the verification data related to the security measure are referred to with 'routing data'.

The information related to the data transfer packet which is used together with the information of quality-of-service class for creating the routing data, can also be some other information related to the applied data transfer protocol than the source address and the destination address mentioned in the above example.

Later in this document, a general term 'protocol data' is used when referring to the information, related to the data transfer packet, which is used together with the information of quality-of-service class in creating the routing data and whose type or value depend on the data transfer protocol used. Said protocol data can be for instance an IPv4 source address (Internet Protocol version 4), an IPv6 source address (Internet Protocol version 6), a TCP source port number (Transmission Convergence Protocol), a UDP source port number (User Datagram Protocol), an IPv4 destination address, an IPv6 destination address, a TCP destination port number, a UDP destination port number, an ATM-VC/VP number (Asynchronous Transfer Mode, Virtual Circuit/Virtual Path), a Frame Relay DLCI (Data Link Connection Identifier), an MPLS label (Multi Protocol Label Switching), information identifying the data transfer protocol used, or a combination of two or more above mentioned pieces of information.

The data transfer link which the routing data refers to can be either a physical data transfer link, such as an optical fiber or a radiolink, or a logical transfer link, such as an IP tunnel configured for a physical data transfer link. Furthermore, in multicast transfer the routing data can refer to more than one data transfer link.

Theoretically, a lineal solution for creating routing data dependent on the quality-of-service class would be a Random Access Memory (RAM) device, for which the memory address to be assigned would be defined by attaching the information of quality-of-service to the protocol data. Said routing data would be provided as the output data of this memory device. The size of the address space of said random access memory device should be at least $2^{N+M}$, where N is the word width of the information of quality-of-service in bits and M is the word width of the protocol data in bits. For example, if the protocol data is an IPv4 destination or source address, the word width of the protocol data is 32 bits. In equipment implementations, reservation is typically made for eight different quality-of-service classes. Consequently, the word width of the information of quality-of-service class is 3 bits. With the present implementation technology of random access memories it is not reasonable to attempt implementation of an address space with a size of $2^{35}$. If the protocol data is an IPv6 destination or source address, the word width of the protocol data is as many as 128 bits.

Figure 2:
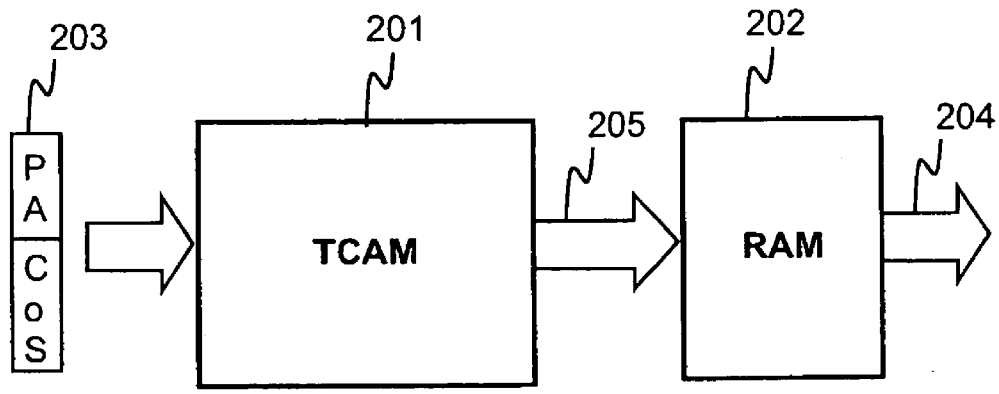

One piece of equipment according to the prior art technique for creating routing data dependent on the quality-of-service class in packet-switched data transfer is shown in FIG. 2. The equipment comprises a Ternary Content Access Memory (TCAM) device 201. The address data used for the TCAM memory device 201 is a combination of the protocol data (PA) and the quality-of-service class (CoS) 203. The output data 205 of the TCAM memory device 201 is used as the address data of a random access memory device 202. The routing data 204 is the output data of the random access memory device 202. Some of the characteristics of the equipment are set forth below in connection with an IPv4 protocol that uses classless addresses (CIDR, Classless InterDomain Routing), when the number of different quality-of-service classes is eight and an IPv4 source or destination address is used as the protocol data (PA).

In routing dependent on the quality-of-service class, each pair, composed of the subnet prefix and the routing data of the routing table to be supported, is associated with a condition of quality-of-service class, which expresses the quality-of-service classes that those data transfer packets represent for which this pair composed of the subnet prefix and the routing data concerned is valid. The information of quality-of-service class CoS can be expressed with three bits, since in this exemplifying situation the number of quality-of-service classes is eight. In the implementation based on a TCAM memory device, said condition of quality-of-service class is expressed as a conditioning vector, which has as many elements as the information of quality-of-service class has bits. Each element of the conditioning vector indicates whether the bit of the information of quality-of-service class must be one or zero or whether this bit can be either of them. For example, if the quality-of-service classes 0, 2, 4 and 6 are acceptable quality-of-service classes, the corresponding conditioning vector would be (*, *, 0), which means that the least meaningful bit of the information of quality-of-service class must be zero and the other two bits can be either zero or one. In this case the condition of quality-of-service class can thus be expressed with one conditioning vector. However, for a certain condition of quality-of-service class more than one conditioning vector is often required, since acceptable quality-of-service classes cannot always be expressed with one conditioning vector. For example, if the quality-of-service classes 1, 2 and 6 are acceptable quality-of-service classes, three conditioning vectors (0,0,1), (0,1,0) and (1,1,0) are required.

The TCAM memory device 201 is used to implement a table, which has the subnet prefix of the routing table to be supported and the conditioning vector as well as the output data of the TCAM memory device corresponding these stored in each of its rows. These rows have a priority order relative to each other. The output data 205 provided by the TCAM memory device corresponds to the row, which has the highest priority of the rows in which the stored subnet prefixes and conditioning vectors correspond to the combination 203 of the protocol data PA and the information of quality-of-service class CoS assigned as the address information. With a suitable mutual prioritizing of the rows it is possible to implement for instance a longest prefix match search dependent on the quality-of-service class (CoS aware longest prefix match).

The size and the price of a TCAM memory device depend on the number of the required rows and the required row length, i.e. the amount of information to be stored in each row. The number of required rows is the number of subnet prefixes of the routing table to be supported multiplied with the average number of conditioning vectors per each subnet prefix. Said average number of conditioning vectors per each subnet prefix means the number of conditioning vectors, which is required on average for expressing a condition of quality-of-service class related to one subnet prefix.

A memory device of the TCAM type is essentially more expensive than a random access memory device of the same size, where the size of the memory device means the product of the address space size and the word width of the output data. In addition, the power consumption of a TCAM type memory device is notably higher than the power consumption of a random access memory device of the same size and which is used with a similar reading frequency. For these reasons, in practical applications it is endeavoured that the size of the TCAM type memory device is as small as possible.

Figure 3:
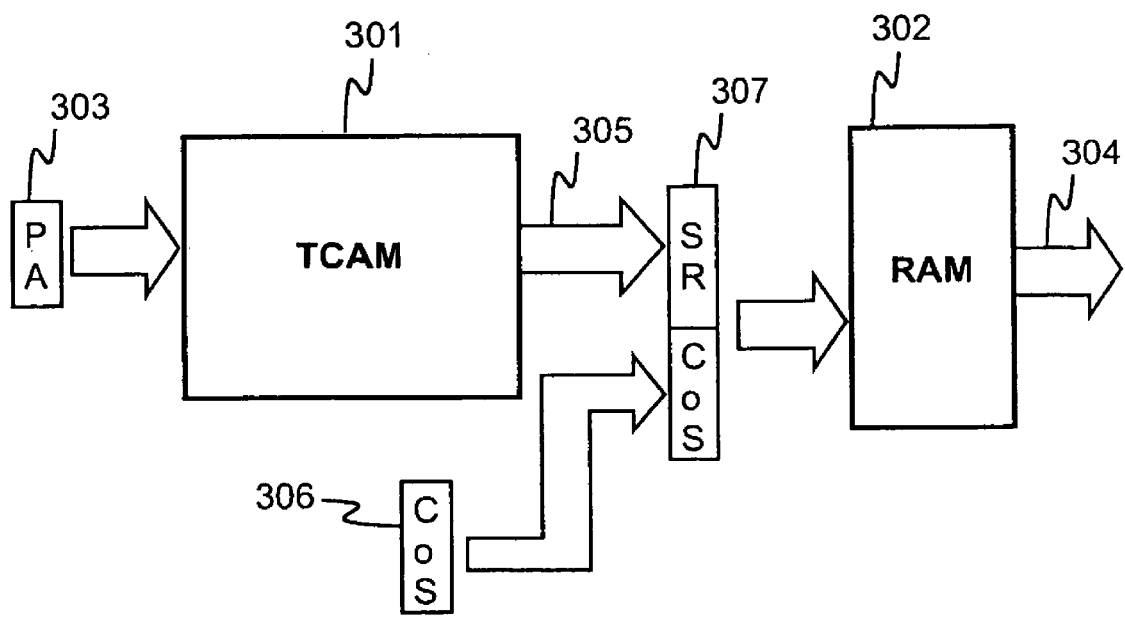

Another piece of equipment according to the prior art technique for creating routing data dependent on the quality-of-service class is shown in FIG. 3. The equipment comprises a TCAM memory device 301. As the address data of the TCAM memory device 301, protocol data 303 (PA) is used. As the address data of a random access memory device 302, the combination of the output data 305 (SR) of the TCAM memory device 301 and the information of quality-of-service class 306 (CoS) is used. The routing data 304 is the output data of the random access memory device 302. In the equipment illustrated in FIG. 3, the effect of the quality-of-service class on the routing data is created by means of the random access memory device 302. For example, in connection with the classless IPv4 routing, the TCAM memory device 301 can be used to perform a normal longest prefix match search independent on the quality-of-service class.

Let us examine a situation in which it is required that each of the devices illustrated in FIGS. 2 and 3 must be capable of supporting the same routing table, and let us assume that the device shown in FIG. 2 requires N conditioning vectors on average per subnet prefix. In this case the TCAM memory device 301 shown in FIG. 3 can be more than N times smaller than the TCAM memory device 201 shown in FIG. 2. That the size ratio is larger than N is due to the fact that conditioning vectors need not be stored in the TCAM memory device 301. On the other hand, the random access memory device 302 shown in FIG. 3 must be larger than the random access memory device 202 shown in FIG. 2, since routing data must be stored in the random access memory device 302 for each combination composed of the subnet prefix and the information of quality-of-service class. Thus, the random access memory device 302 shown in FIG. 3 must be essentially larger than the random access memory device 202 shown in FIG. 2, whereupon a large part of the savings, which are achieved by the reducing size required of the TCAM memory device, is lost as the size required of the random access memory device increases.

The TCAM memory devices shown in FIGS. 2 and 3 can be replaced with an algorithmic search engine. An algorithmic search engine can be implemented using random access memory devices, which are more cost-effective than the content addressable memory devices and the power consumption of which is lower than the power consumption of the content addressable memory devices. In methods based on algorithmic search engines, several successive memory searches are performed, the intermediate results of which are used as the basis in advancing in the logical search structure until a result corresponding to the initial data of the search, such as the protocol data or a combination of the protocol data and the information of quality-of-service class, is found. Algorithmic search engines known for those skilled in the art include, for example, a radix-trie, a Patricia-trie, an M-ary trie, and the Luleå algorithm (according to established practice, the term "trie", for retrieval, is used here). An algorithmic search engine, which is capable of performing a search dependent on a quality-of-service class and which can be used to replace the TCAM memory device shown in FIG. 2, is at least functionally more complicated and requires a higher storage capacity than an algorithmic search engine, which only needs to perform a search independent of the quality-of-service class and which can be used to replace the TCAM memory device shown in FIG. 3. On the other hand, a large part of the savings, which are achieved by the simplification of the algorithmic search engine, is lost as the size required of the random access memory device increases in a similar way as in connection with the equipment based on the TCAM memory devices.

It is typical for the equipment and methods according to the prior art technique that the requirement for considering the quality-of-service class in creating the routing data essentially increases the storage capacity required of the equipment and thus often also the power consumption of the equipment. The increase of the required storage capacity increases the component costs, physical size and the production and testing costs of the equipment. Likewise, increased power consumption increases the physical size and costs of the equipment.

SUMMARY OF INVENTION

The invention relates to a method for creating routing data dependent on the quality-of-service class such that by means of the invention it is possible to remove or reduce limitations and disadvantages associated with the prior art technique. The invention also relates to equipment for creating routing data dependent on the quality-of-service class such that by means of the invention it is possible to remove or reduce limitations and disadvantages associated with the prior art technique. The invention also relates to a network element for controlling data transfer packets in packet-switched data communications such that by means of the invention it is possible to remove or reduce limitations and disadvantages associated with the prior art technique. The invention also relates to a search module, which can be used in the network element for creating routing data dependent on the quality-of-service class of the data transfer packet such that by means of the invention it is possible to remove or reduce limitations and disadvantages associated with the prior art technique. The invention also relates to a computer software, which is stored in a medium readable by a processor, for creating routing data dependent on the quality-of-service class of the data transfer packet in a network element controlling packet-switched data communications, such that by means of the invention it is possible to remove or reduce limitations and disadvantages associated with the prior art technique.

The basis of the invention lies in the utilization of the fact that in typical packet-switched data communication networks the number of different quality-of-service classes is higher than the average number, corresponding to the protocol data, of routing data alternatives selectable based on the information of quality-of-service class. In other words, it is very unlikely that as many different routing data alternatives would correspond to certain protocol data as there are quality-of-service classes in the data transfer system. For example, in IPv4 and IPv6 networks, in which reservation is typically made for eight different quality-of-service classes, the average number of different routing data alternatives corresponding to the destination or source address is typically in the range of 1-3.

The invention consists in that, based on the protocol data and the information of quality-of-service class, auxiliary data is defined, which indicates which of the routing data alternatives corresponding to this protocol data conforms to said quality-of-service class. Thus the number of different combinations composed of protocol data and auxiliary data appearing in the practical data transfer networks is notably smaller than the number of different combinations composed of protocol data and information of quality-of-service class. This fact is utilized in the solution according to the invention for reducing the amount of required storage capacity.

With the invention, the significant advantage is achieved that by means of the invention it is possible to reduce the storage capacity required for storing and retrieving routing data dependent on the quality-of-service class in a network element controlling packet-switched data communications. In this way savings are achieved in the component, production and testing costs of the equipment. In addition, the equipment can be constructed with a smaller size. As it is possible to construct the equipment using smaller memory devices, savings are also achieved in the power consumption, whereupon the implementation of cooling and the power supply of the equipment will be simpler and more cost-efficient.

The method, equipment, network element, search module and computer software according to the invention are characterized in what is stated in the characterizing parts of the corresponding independent claims.

The different embodiments of the invention are characterized in what is stated in the dependent claims.

SHORT DESCRIPTION OF FIGURES

Figure 4:
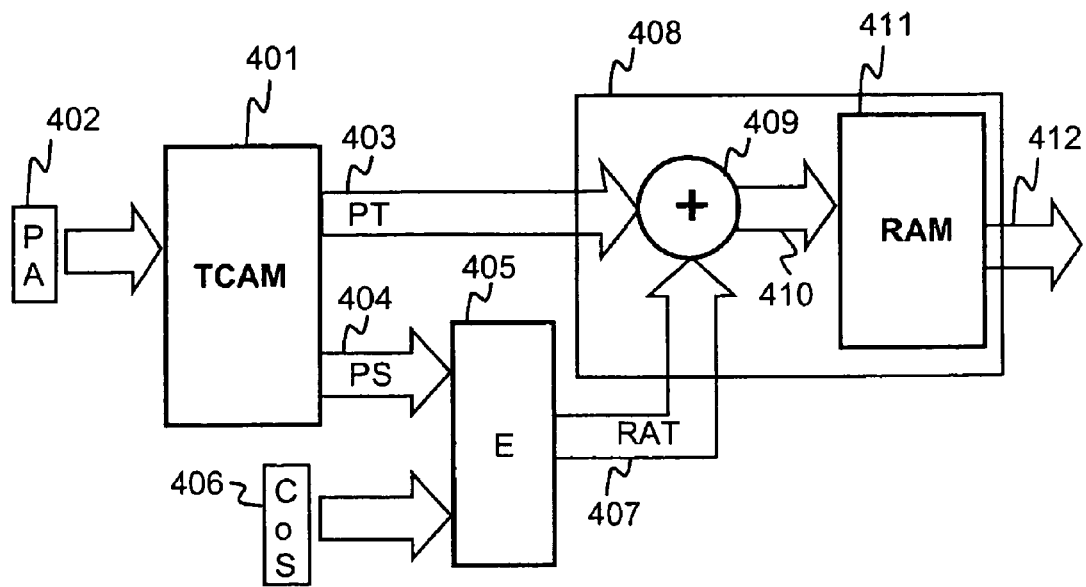
Figure 5:
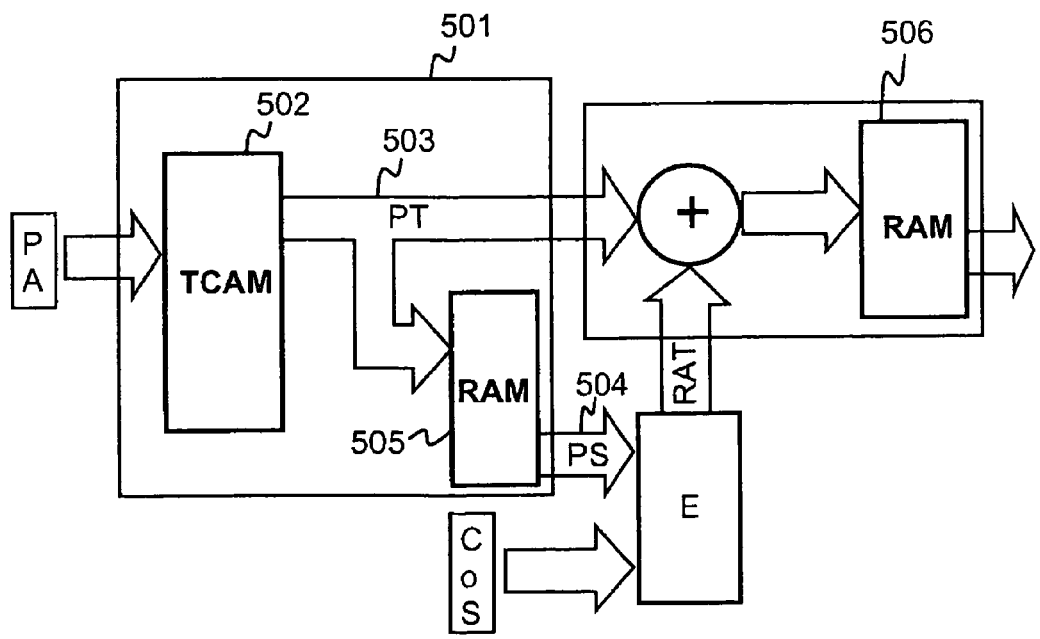
Figure 6:
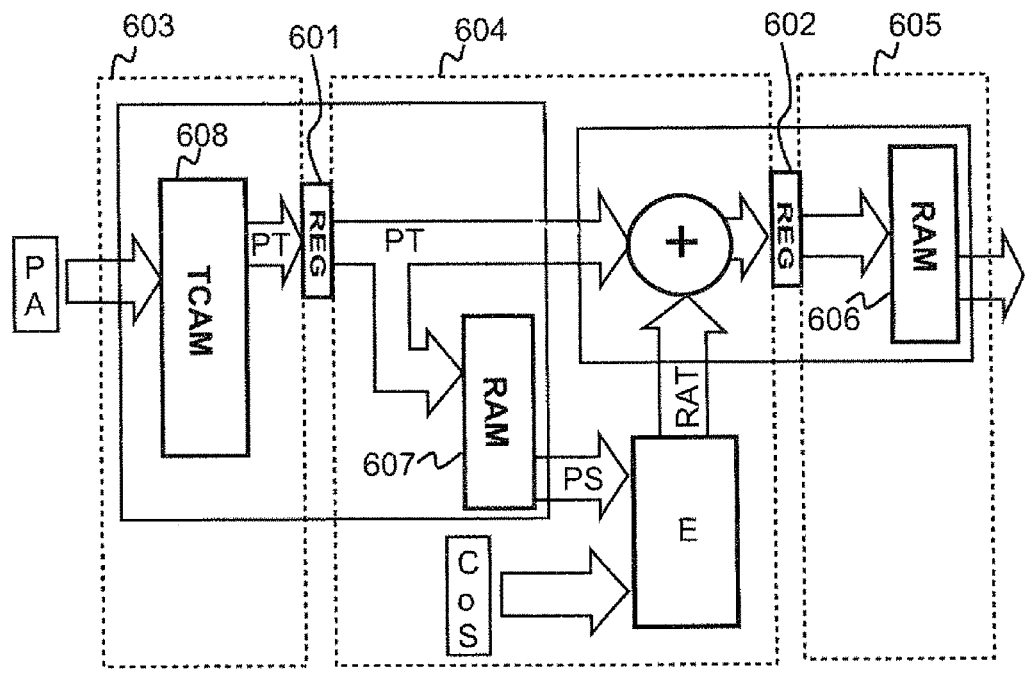
Figure 7:
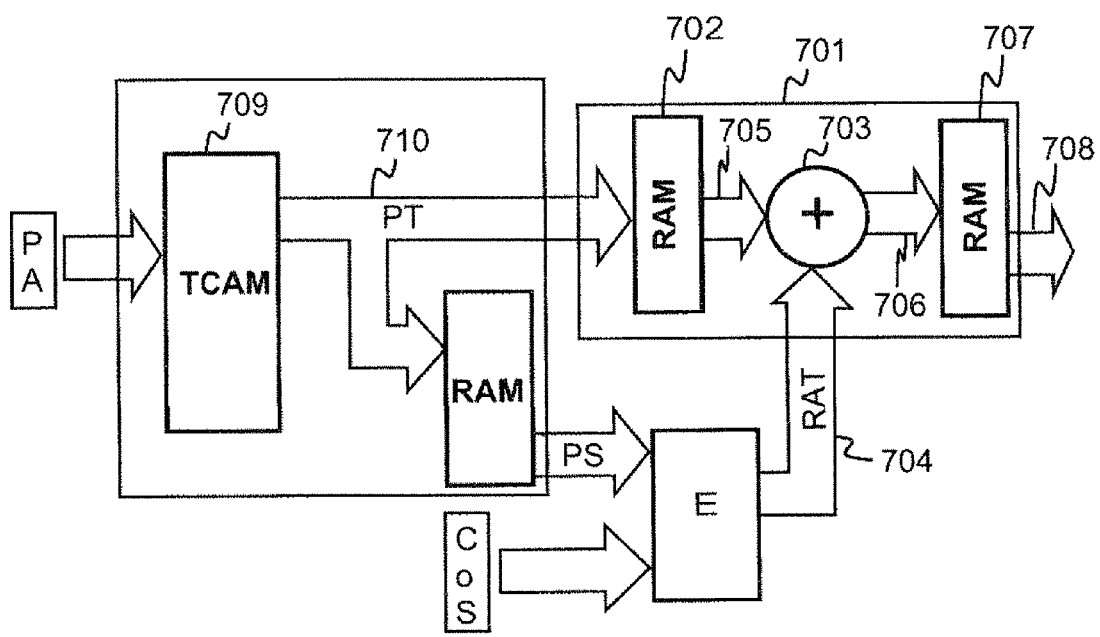
Figure 8:
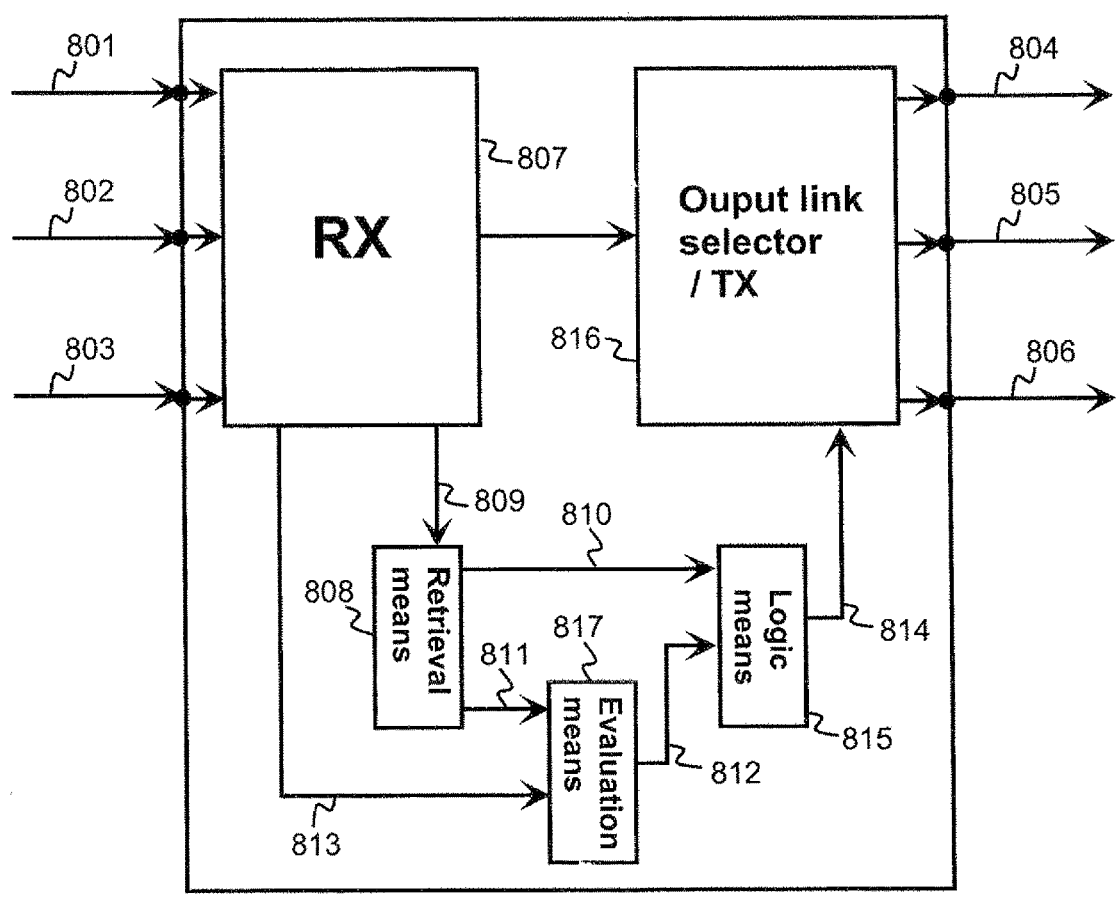
Figure 9:
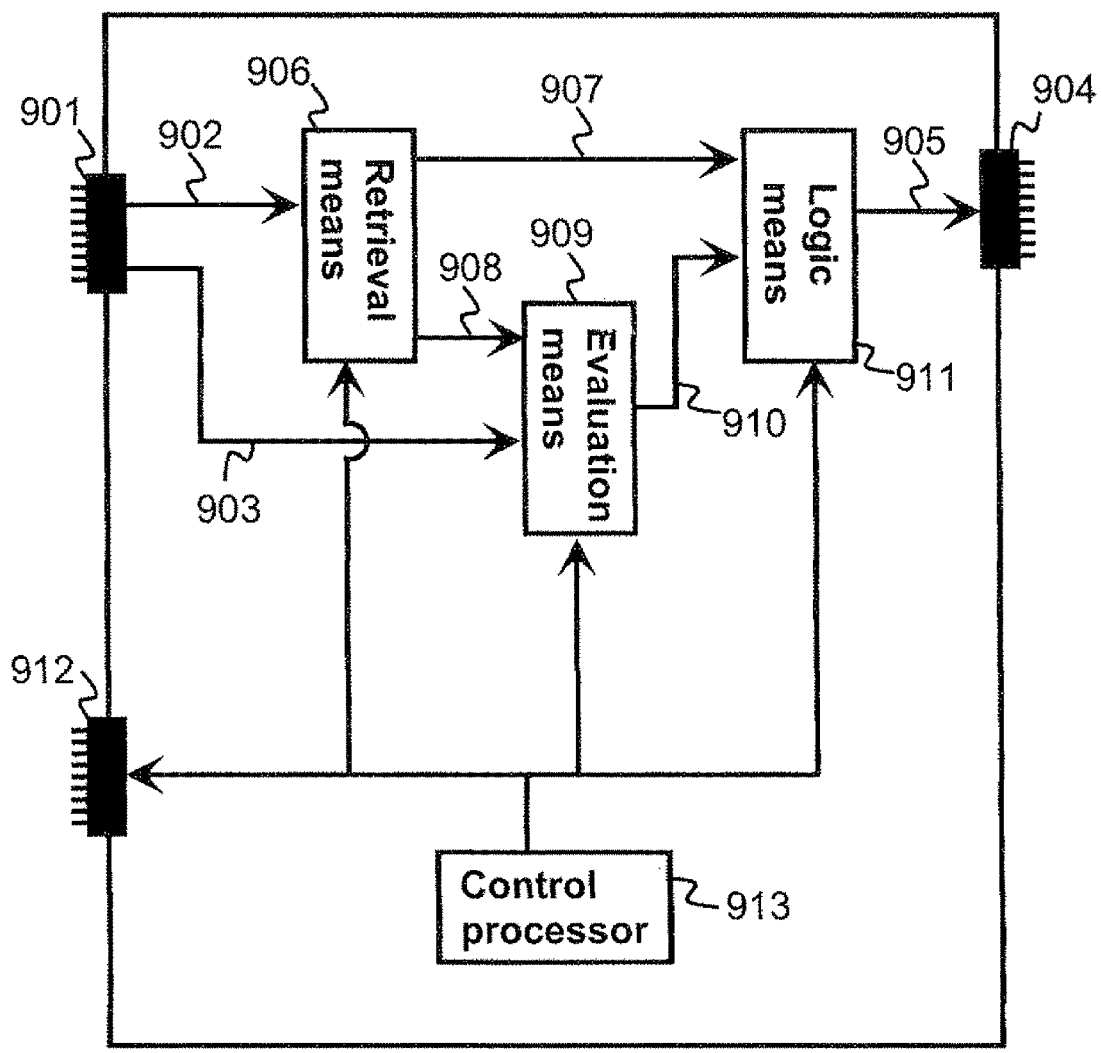
Figure 10:
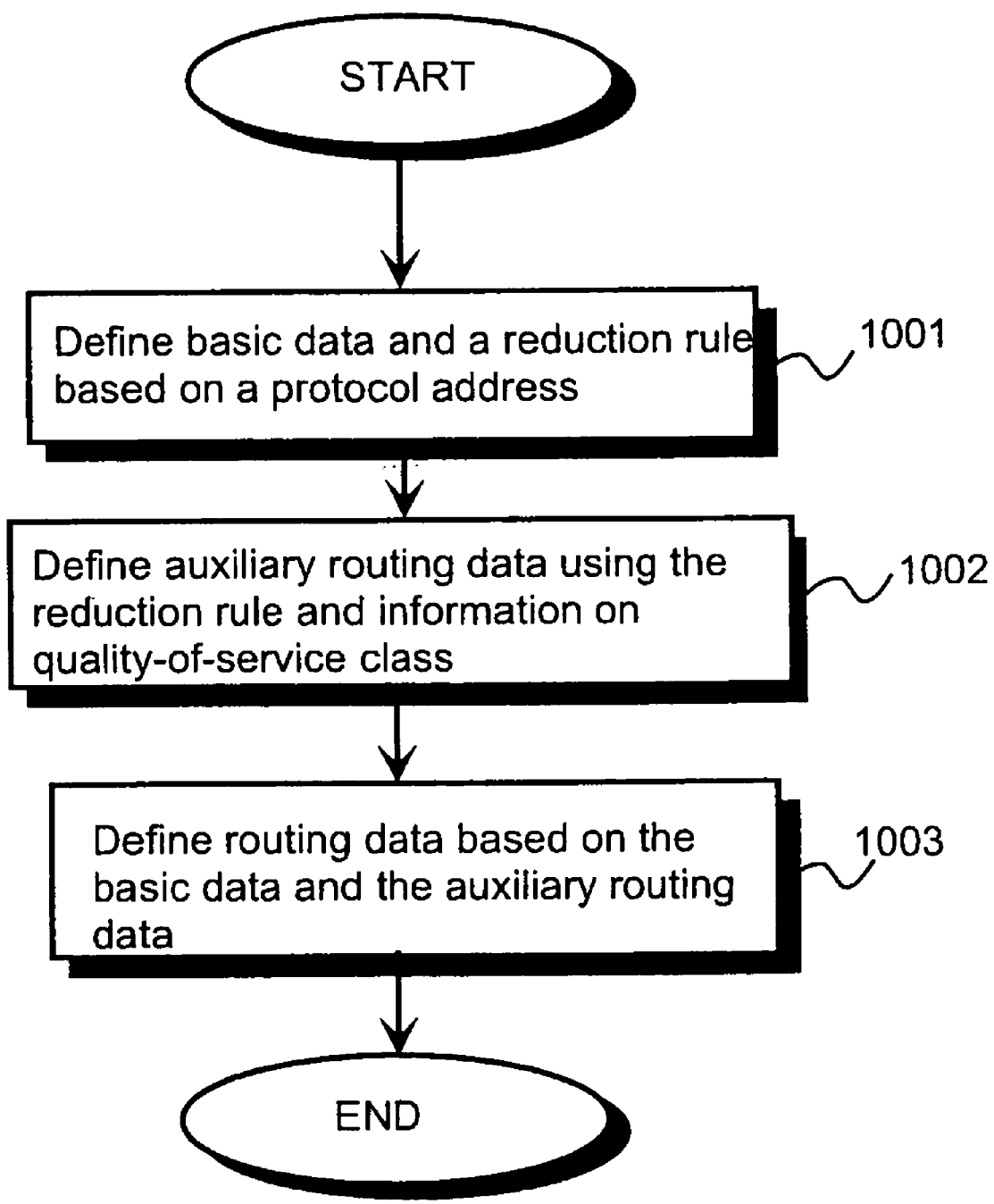

The invention is described below in more detail by making reference to the proposed advantageous embodiments given as examples and to enclosed figures, in which FIG. 1 shows an exemplifying packet-switched data communication network for illustrating the background of the invention, FIG. 2 shows one piece of equipment according to the prior art technique for creating routing data dependent on the quality-of-service class in packet-switched data transfer, FIG. 3 shows another piece of equipment according to the prior art technique for creating routing data dependent on the quality-of-service class in packet-switched data transfer, FIG. 4 shows equipment according to one embodiment of the invention for creating routing data dependent on the quality-of-service class in packet-switched data transfer, FIG. 5 shows equipment according to one embodiment of the invention for creating routing data dependent on the quality-of-service class in packet-switched data transfer, FIG. 6 shows equipment according to one embodiment of the invention for creating routing data dependent on the quality-of-service class in packet-switched data transfer, FIG. 7 shows equipment according to one embodiment of the invention for creating routing data dependent on the quality-of-service class in packet-switched data transfer, FIG. 8 shows a network element according to one embodiment of the invention for controlling the traffic of data transfer packets in packet-switched data transfer, FIG. 9 shows a search module according to one embodiment of the invention for creating routing data dependent on the quality-of-service class in packet-switched data transfer, FIG. 10 is a flow chart showing a method according to one embodiment of the invention for creating routing data dependent on the quality-of-service class in packet-switched data transfer.

DETAILED DESCRIPTION OF EMBODIMENTS OF INVENTION

FIGS. 1-3 are described earlier in this document in connection with the description of the prior art technique.

FIG. 4 illustrates equipment according to one embodiment of the invention for creating routing data dependent on the quality-of-service class in packet-switched data communications, in which each data transfer packet represents one of at least two quality-of-service classes and associated with each data transfer packet there is information of quality-of-service class 406 (CoS). The equipment comprises data retrieval means 401 for defining basic data 403 (PT) and a reduction rule 404 (PS) corresponding to the protocol data 402 (PA) related to said data transfer packet. The reduction rule 404 is a description that connects to each quality-of-service class auxiliary data, which determines which of the routing data alternatives conforming to this protocol data corresponds to each quality-of-service class. Evaluation means 405, based on the reduction rule 404 and the information of quality-of-service class 406, define the auxiliary routing data 407 (RAT), which consists of auxiliary data conforming to said reduction rule 404 and information of quality-of-service class 406. The routing data 412 conforming to the protocol data 402 and the information of quality-of-service class 406 is created using logic means 408, based on the interaction of the basic data 403 and auxiliary routing data 407. In this embodiment of the invention, said data retrieval means 401 are realized using a ternary content access memory device (TCAM). The logic means 408 comprise a summation element 409, which is used to calculate the sum 410 of the auxiliary routing data 407 and the basic data 403, and a random access memory device 411, whose address data consists of said sum 410 and whose output represents the routing data 412.

The TCAM memory device 401 is used to create a reference table which has the reference value of the routing table to be supported as well as the basic data and the reduction rule conforming to it stored in each of its rows. This reference value is a bit vector, which is compared to the bit representation of the protocol data. The TCAM memory device can be used for creating reference values in such a way that no requirements are set for certain protocol data bits while certain other bits must have predefined values in order that the protocol data examined would be compatible with the reference value concerned. Thus the TCAM memory device can be used to perform both a Partial match search and an Exact match search. For the table rows in question, it is possible to define an order of priority relative to each other. In this way, the TCAM memory device can be used to perform, for example, a longest compatible subnet prefix search (longest prefix match, LPM) required in classless IP routing, in which case the reference values represent the subnet prefixes. The basic data and the reduction rule corresponding to certain protocol data consist of the basic data and the reduction rule that correspond to the reference value compatible with said protocol data. The exact meaning of compatibility depends on the protocol used. In classless IP routing, for example, when the protocol data is an IP destination address or an IP source address, a compatible reference value refers to the longest subnet prefix compatible with the protocol data.

In this embodiment of the invention, the reduction rule 404 is a table, the element number of which is the number N of the different quality-of-service classes. The table element i is the auxiliary data conforming to the quality-of-service class i, where i=0, 1, 2, . . . , N−1. The evaluation means 405 select the table element corresponding to the information of quality-of-service class 406 as the value of the auxiliary routing data 407. The value of the table element is one of the alternative M values, where M is the number of routing data alternatives related to the reference value examined. For most reference values, the number of routing data alternatives related to the reference value concerned is notably smaller than the number of different quality classes, i.e. M<N.

The random access memory device 411 is used to create a routing data table, in a row of which, corresponding to a certain value of the sum 410, routing data conforming to this sum value is stored. For a certain reference value in the routing table, it is necessary to have M routing data table rows, where M is the number of routing data alternatives related to the reference value examined. If the number of reference values in the routing table is K and the average number of routing data alternatives related to the reference value is M_ave, the number of routing data table rows is K×M_ave, which is simultaneously the required address space size of the random access memory device 411. If the reduction rule were not used, but the address data of the random access memory device 411 would be created based on the basic data 403 and the information of quality-of-service class 406, the required number of routing data table rows would be K×N. For example, in IPv4 and IPv6 networks, in which reservation is typically made for eight different quality-of-service classes, i.e. N=8, said average value M_ave is typically in the range of 1-3. Thus, using the reduction rule it is possible to remarkably reduce the required storage capacity of the random access memory device 411.

Let us examine the following exemplifying situation, in which M1 routing data alternatives are related to reference value V1, M2 routing data alternatives are related to reference value V2, and M3 routing data alternatives are related to reference value V3. In this case, the row range PT1 . . . PT1+M1 of the routing data table contains the routing data alternatives related to reference value V1, the row range PT2 . . . PT2+M2 contains the routing data alternatives related to reference value V2, and the row range PT3 . . . PT3+M3 contains the routing data alternatives related to reference value V3, where PT1, PT2 and PT3 are basic data corresponding to said reference values V1, V2 and V3. Said basic data must be so selected that said row ranges are not even partially overlapping. Let us assume that the row ranges corresponding to reference values V1, V2 and V3 are located successively without gaps in the routing data table. Then PT2=PT1+M1+1 and PT3=PT2+M2+1. If M1 and M2 are unequal, the basic data values PT1, PT2 and PT3 are located at unequal distances in the number line. The basic data values could naturally also be selected at equal distances leaving empty rows between the row ranges related to the reference values, but this would lead to unoptimal use of the random access memory device in which case the capacity of the random access memory device 411 should be higher.

This unequality in distance complicates the creation of the basic data and the routing data table as well as updating of the basic data and the routing data table, which is performed as the routing table changes. For creating and updating the basic data and the routing data table, it is possible to use memory management methods according to the prior art technique, such as the method according to the Malloc function (Memory allocation) known from the C programming language.

The operation of the equipment shown in FIG. 4 for creating routing data 412 dependent on the quality-of-service class is as follows. The protocol data 402 determines the basic data 403, to be selected from the reference table created with the TCAM memory device, and the reduction rule 404, which is a table with N elements. The information of quality-of-service class 406 determines the element to be selected from said table with N elements, this element consisting of the auxiliary routing data 407. The sum of the auxiliary routing data 407 and the basic data 403 determines the routing data 412 to be selected from the routing data table implemented with the random access memory device 411.

In equipment according to one embodiment of the invention, the TCAM memory device 401 shown in FIG. 4 has been replaced with an algorithmic search engine. Said search algorithm can be, for example, a radix-trie, a Patricia-trie, an M-ary trie or the Luleå algorithm.

In equipment according to one embodiment of the invention, the TCAM memory device 401 shown in FIG. 4 has been replaced with a binary content addressable memory device CAM, which can be used to perform a perfect match search between the reference values and the protocol data.

The evaluation means 405 can be implemented using, for example, an application specific integrated circuit (ASIC), a programmable processor and a process software controlling this processor, a Field Programmable Gate Array (FPGA) or a combination of the implementation solutions mentioned. It is also possible to integrate into one integrated circuit two or all of the following: the TCAM memory device 401, evaluation means 405 and logic means 408.

FIG. 5 shows equipment according to one embodiment of the invention for creating routing data dependent on the quality-of-service class in packet-switched data communications. In this embodiment of the invention, the data retrieval means 501 for defining the basic data 503 and the reduction rule 504 have been implemented using a ternary content access memory (TCAM) device 502 and a random access memory device 505. The advantage of the equipment shown in FIG. 5 compared to the equipment shown in FIG. 4 is that part of the expensive TCAM memory has been replaced with less expensive random access memory. Reduction rules need not be stored in the reference table created with the TCAM memory device 502 shown in FIG. 5, since the reduction rule is read from the random access memory 505 based on the basic data 503. For example in a situation, in which the number of quality-of-service classes is eight, a reduction rule in a table form has eight elements and each element must be capable of expressing eight different values. Eight different values are needed in such a special case in which a different routing data alternative corresponds to each different quality-of-service class. Such a special case is rare in the practical data transfer networks, but reservation must be made even for this. Eight different values can be expressed with three bits (000 . . . 111). Consequently, for describing one reduction rule, 3×8=24 bits are required. In case the routing table to be supported contains, for example, a million reference values, 24 Mbits are required for the reduction rules. In a general case, in which the number of quality-of-service classes is N, for expressing a lineal tabular-form reduction rule, it is necessary to have $$N \times \text{Ceiling}\{\log_2(N)\} \tag{1}$$

bits, where $\log_2$ is a logarithm, whose base number is two, and Ceiling{ } is a function, whose value is the smallest integer that is greater than or equal to the argument of the function.

In equipment according to one embodiment of the invention, the TCAM memory device 502 shown in FIG. 5 has been replaced with an algorithmic search engine. Said search algorithm can be, for example, a radix-trie, a Patricia-trie, an M-ary trie or the Luleå algorithm.

In equipment according to one embodiment of the invention, the TCAM memory device 502 shown in FIG. 5 has been replaced with a binary content addressable memory device CAM, which can be used to perform a perfect match search between the reference values and the protocol data.

When performing the creation of routing data dependent on the quality-of-service class using equipment according to FIG. 5, one additional memory search is required compared to the equipment of FIG. 4. In the equipment according to FIG. 4, memory searches are performed from the TCAM memory device 401 and from the random access memory device 411. In the equipment according to FIG. 5, memory searches are performed from the TCAM memory device 502, from the random access memory device 505, and from the random access memory device 506. The operation of equipment shown in FIGS. 4 and 5 can be phased (pipelined) in such a way that the number of required memory searches does not affect the retrieval speed, i.e. the number of routing data items created in a unit of time. An example of a method of performing phasing (pipelining) for the operation of the equipment shown in FIG. 5 is illustrated in FIG. 6.

The equipment shown in FIG. 6 has been divided into execution sections 603, 604 and 605 by means of phasing registers 601 and 602. Let us examine temporally successive routing data creation tasks h0, h1, h2 and h3, of which h0 is temporally the first. Let us assume that, with respect to the routing data creation task h0, the operation is in the stage in which a memory search is performed from the random access memory device 606. While a memory search for the routing data creation task h0 is performed from the random access memory device 606, a memory search for the routing data creation task h1 is performed from the random access memory device 607, and a memory search for the routing data creation task h2 is performed from the TCAM memory device 608. In the following phasing cycle, a memory search for the routing data creation task h1 is performed from the random access memory device 606, a memory search for the routing data creation task h2 is performed from the random access memory device 607, and a memory search for the routing data creation task h3 is performed from the TCAM memory device 608. Thus the number of required memory searches does not affect the retrieval speed, i.e. the number of routing data items created in a unit of time. However, the retrieval delay, i.e. the time required for creating the routing data, is affected by the number of required memory searches.

In equipment according to one embodiment of the invention, the TCAM memory device 608 shown in FIG. 6 has been replaced with an algorithmic search engine. Said search algorithm can be, for example, a radix-trie, a Patricia-trie, an M-ary trie or the Luleå algorithm.

In equipment according to one embodiment of the invention, the TCAM memory device 608 shown in FIG. 6 has been replaced with a binary content addressable memory device CAM, which can be used to perform a perfect match search between the reference values and the protocol data.

FIG. 7 shows equipment according to one embodiment of the invention for creating routing data dependent on the quality-of-service class in packet-switched data communications. The logic means 701 comprise a random access memory device 702, a summation element 703 and a random access memory device 707. The summation element 703 creates the sum 706 of the auxiliary routing data 704 and the output data 705 of the random access memory device 702, this sum functioning as the address data of the random access memory device 707. The output of the random access memory device 707 represents the routing data 708. In this embodiment of the invention, the basic data corresponding to the reference values contained in the reference table created by the TCAM memory device 709 can be expressed with successive numbers. In this case, the number of bits required for expressing each basic data item is smaller than in the earlier described situation, in which said basic data had to be located, in a general case, at unequal distances in the number line. Because the number of required bits for expressing the basic data is smaller, the word width of the output of the expensive TCAM memory device can be reduced. On the other hand, a random access memory device 702 is required, for which basic data 710 is used as the address data and whose output data 705 corresponds to the unevenly distributed basic data occurring in the above text and in the embodiments shown in FIGS. 4-6. The random access memory is, however, essentially less expensive than the TCAM memory and in addition, the power consumption of the random access memory is essentially lower than the power consumption of the TCAM memory. The operation of the equipment shown in FIG. 7 can be phased according to the principle set forth in the preceding text and in FIG. 6.

In equipment according to one embodiment of the invention, the TCAM memory device 709 shown in FIG. 7 has been replaced with an algorithmic search engine. Said search algorithm can be, for example, a radix-trie, a Patricia-trie, an M-ary trie or the Luleå algorithm.

In equipment according to one embodiment of the invention, the TCAM memory device 709 shown in FIG. 7 has been replaced with a binary content addressable memory device CAM, which can be used to perform a perfect match search between the reference values and the protocol data.

Each of the random access memory devices in the equipment shown in FIGS. 5, 6 and 7 can be implemented using separate RAM memory circuits, or more than one random access memory device can be implemented with one multi-bank RAM memory circuit. Advantageously, the random access memory devices can be implemented using dynamic RAM memory (DRAM), the required physical space, price and power consumption of which per stored bit are essentially smaller than the corresponding properties of the TCAM memory.

The lineal tabular-form reduction rule set forth in connection with the above described embodiments of the invention is perfect in the sense that the number of different auxiliary routing data values corresponding to a certain reference value, such as a subnet prefix, is the smallest possible. In other words, this number is the same as the number of routing data alternatives corresponding to the examined reference value. In an example situation, in which the number of quality-of-service classes is eight, 24 bits are required according to equation (1) for expressing a lineal tabular-form reduction rule. A mathematical analysis can show that at least 12 bits are required for expressing the reduction rule in this exemplifying situation. Decreasing the number of bits required for expressing the reduction rule close to the theoretical lower limit, however, requires using coding methods that are more complicated than the lineal tabular representation.

Below is a description of an implementation method of an imperfect reduction rule, which method can be used in equipment according to the embodiments of the invention set forth in the above text and in FIGS. 4-7. The reduction rule is imperfect in the sense that the number of the auxiliary routing data values corresponding to a certain reference value, such as a subnet prefix, can in certain cases be higher than the number of routing data alternatives corresponding to the examined reference value. The reduction rule is based on the fact that when examining a randomly selected routing table reference value, it is likely that the same routing data corresponds to several quality-of-service classes.

When creating a reduction rule related to a certain reference value, one of the routing data alternatives associated with this reference value is selected. Without limiting the universality, the set of the quality-of-service classes related to the selected routing data alternative can be referred to as set G. Advantageously that of the routing data alternatives is selected which corresponds to the greatest number of different quality-of-service classes such that set G will include as many quality-of-service classes as possible. One auxiliary routing data value is set to correspond to each quality-of-service class belonging to set G. This auxiliary routing data value is labelled with symbol A. For the quality-of-service classes not belonging to set G, each quality-of-service class is assigned an individual auxiliary routing data value: B, B+1, B+2, . . . .

The reduction rule is expressed as a one-dimensional table or as vector V, the value of each of its elements being either a predefined constant p or a predefined constant q and the number of elements thereof being the number N of the different quality-of-service classes. If the location of the element in vector V corresponds to the quality-of-service class belonging to set G, said element is assigned a value of p, otherwise said element is assigned a value of q. Said auxiliary routing data is determined as follows:

if the value of the element, located in a position of vector V that corresponds to the information of quality-of-service class CoS of the examined data transfer packet, is p, said auxiliary routing data is A, or if the value of the element, located in a position of vector V that corresponds to the information of quality-of-service class CoS of said data transfer packet, is q, said auxiliary routing data is B increased with the number of elements, the value of which is q and which are located in that portion of vector V which remains on the predefined side relative to the position of vector V that corresponds to the information of quality-of-service class CoS of said data transfer packet.

Advantageously it is possible to select: $p=0$, $q=1$, $A=0$ and $B=1$. In this case, the 0 value of the auxiliary routing data corresponds to the quality-of-service classes belonging to set G and values 1, 2, 3, . . . of the auxiliary routing data correspond to the other quality-of-service classes. Since a vector element can be expressed with one bit, the number of bits required for expressing the reduction rule is the same as the number N of the quality-of-service classes.

Set forth below is an implementation example of a reduction rule related to a certain reference value corresponding to an exemplifying situation in which the number of quality-of-service classes $N=8$, the quality-of-service classes QoS0, QoS3, QoS5, and QoS7 correspond to the routing data RT1, the quality-of-service classes QoS1 and QoS2 correspond to the routing data RT2, the quality-of-service class QoS4 corresponds to the routing data RT3 and the quality-of-service class QoS6 corresponds to the routing data RT4 (QoS, Quality of Service). As the routing data RT1 corresponds to the greatest number of different quality-of-service classes, it is advisable to select as set G the quality-of-service classes QoS0, QoS3, QoS5, and QoS7 corresponding to the routing data RT1. In this case the auxiliary routing data corresponding to these quality-of-service classes is 0. Vector V is as follows in this example:

$$V=(0, 1, 1, 0, 1, 0, 1, 0), \quad (2)$$

where the elements of the vector positions 0, 3, 5 and 7 corresponding to the quality-of-service classes QoS0, QoS3, QoS5, and QoS7 are zero. In this example the vector position corresponding to the quality-of-service class QoS0 is at the far left, the following vector position when moving to the right corresponds to the quality-of-service class QoS2, and so on. The conformity order of vector positions and quality-of-service classes has no significance as regards the principle of the reduction rule. If the information of quality-of-service class CoS of the data transfer packet is 0, 3, 5 or 7, the vector element corresponding to the information of quality-of-service class is 0 and the corresponding auxiliary routing data is 0. Assuming it to be defined that in a situation in which the vector element corresponding to the information of quality-of-service class CoS is 1, the elements remaining to the left of this element, the value of which is 1, are calculated. In this case the values of the auxiliary routing data, corresponding to the values of the information of quality-of-service class 1, 2, 4 and 6, are 1, 2, 3 and 4 respectively. Assuming it to be defined that the elements remaining to the right of the vector element corresponding to the information of quality-of-service class CoS, the value of which is 1, are calculated, the values of the auxiliary routing data, corresponding to the values of the information of quality-of-service class 1, 2, 4 and 6, are 4, 3, 2 and 1 respectively. In this example the imperfection of the reduction rule becomes evident in that the auxiliary routing data values corresponding to values 1 and 2 of the information of quality-of-service class are unequal relative to each other, although the quality-of-service classes QoS1 and QoS2 conform to the same routing data RT2.

FIG. 8 shows a network element according to one embodiment of the invention for controlling the traffic of data transfer packets in packet-switched data communications. Data transfer packets arrive at the network element via input links 801, 802 and 803 connected to the network element. Data transfer packets leave the network element via output links 804, 805 and 806 connected to the network element. The data transfer packet is associated with a source address SA, a destination address DA and information of quality-of-service class CoS. The network element comprises means 807 for receiving incoming data transfer packets and for reading said source address, destination address and information of quality-of-service class from the arrived data transfer packet. The network element can additionally comprise means for creating information of quality-of-service class based on the packet classification. The network element comprises data retrieval means 808 for defining basic data 810 and a reduction rule 811 corresponding to the destination address 809 related to the income data transfer packet. The reduction rule is arranged to connect auxiliary data to each quality-of-service class in such a way that the same auxiliary data can be connected to at least two different quality-of-service classes. The network element comprises evaluation means 817 for defining auxiliary routing data 812. Said auxiliary routing data 812 consists of auxiliary data corresponding to the reduction rule 811 and the information of quality-of-service class 813. The network element comprises logic means 815 for defining routing data 814 based on the interaction of the basic data 810 and the auxiliary routing data 812. The network element comprises means 816 for selecting one or more output links 804-806 based on the routing data 814 and for sending information corresponding to said data transfer packet to the selected output link/links.

The machinery built up by the data retrieval means 808, evaluation means 817 and logic means 815 can be equipment according to any embodiment described in the above text and in FIGS. 4-7.

The network element can additionally comprise means for creating routing data corresponding to the source address and the information of quality-of-service class and means for enabling or disabling the delivery of the data transfer packet based on the routing data corresponding to said source address. The routing data corresponding to said source address can be associated with a safety measure which is used to verify (RAL, Reverse Address Lookup) if the data transfer packet has arrived from such an area of the data transfer network that corresponds to the source address indicated in this data transfer packet. The routing data corresponding to the source address can be created using the same machinery 808, 815, 817 as for the routing data 814 corresponding to the destination address, or it is possible to have parallel machineries for creating said routing data.

The input link 801, 802 or 803 can be either a physical data transfer link, such as an optical fiber or a radiolink, or a logical transfer link, such as an IP tunnel configured for a physical data transfer link. Correspondingly, the output link 804, 805 or 806 can be either a physical data transfer link or a logical data transfer link.

The network element concerned can be, for example, a router used in the IP network, a switch used in the ATM network (ATM, Asynchronous Transfer Mode) or a switch used in the Ethernet network.

FIG. 9 shows a search module according to one embodiment of the invention for creating routing data dependent on the quality-of-service class in packet-switched data transfer. The search module comprises an input interface 901 for receiving the protocol data 902 and the information of quality-of-service class 903 of a data transfer packet, and an output interface 904 for transferring the routing data 905 created for said data transfer packet to outside the search module. The search module comprises data retrieval means 906 for defining basic data 907 and a reduction rule 908 corresponding to said protocol data 902. The reduction rule is arranged to connect auxiliary data to each quality-of-service class in such a way that the same auxiliary data can be connected to at least two different quality-of-service classes. The search module comprises evaluation means 909 for defining auxiliary routing data 910 based on the reduction rule 908 and the information of quality-of-service class 903. The auxiliary routing data 910 consists of auxiliary routing data corresponding to the information of quality-of-service class 903. The search module comprises logic means 911 for creating routing data 905 based on the interaction of the basic data 907 and said auxiliary routing data 910.

The machinery built up by the data retrieval means 906, evaluation means 909 and logic means 911 can be equipment according to any embodiment described in the above text and in FIGS. 4-7.

The search module can additionally comprise a control interface 912 for storing the data in the memory devices included in the search module and possibly also for reading the data stored in the memory devices. The control interface is not required if data storing and possible reading is performed via the input interface 901 and/or the output interface 904.

The search module can additionally comprise a control processor 913, which carries out the control of phasing of the various functions, for example according to the principle shown in FIG. 6, as well as control and statistics collection functions.

FIG. 10 includes a flow chart showing a method according to one embodiment of the invention for creating routing data dependent on the quality-of-service class in packet-switched data transfer, in which each data transfer packet represents one of at least two quality-of-service classes and associated with each data transfer packet there is information of quality-of-service class CoS. In stage 1001, basic data and a reduction rule are defined based on the protocol data related to the data transfer packet. The reduction rule attaches auxiliary data to each quality-of-service class in such a way that the same auxiliary data is related to at least two different quality-of-service classes. Stage 1002 consists of defining auxiliary routing data, which is auxiliary data corresponding to said reduction rule and information of quality-of-service class CoS related to said data transfer packet. In stage 1003, routing data is defined based on the interaction of said basic data and said auxiliary routing data. Said protocol data can be, for example, the destination address related to the data transfer packet or the source address related to the data transfer packet.

In a method according to one embodiment of the invention, said reduction rule is expressed as a table, which includes auxiliary data corresponding to the different quality-of-service classes and from which said auxiliary routing data is defined by means of a table search using the information of quality-of-service class of said data transfer packet as the table indicator.

In a method according to one embodiment of the invention, said reduction rule is expressed as a vector, the value of each element of which is either a predefined constant p or a predefined constant q, and the number of elements of which is the number of different quality-of-service classes, and said auxiliary routing data is defined as follows:
  if the value of the element, located in a vector position that corresponds to the information of quality-of-service class of said data transfer packet, is p, said auxiliary routing data is the first predefined auxiliary data value, or
  if the value of the element, located in a vector position that corresponds to the information of quality-of-service class of said data transfer packet, is q, said auxiliary routing data is the second predefined auxiliary data value increased with the number of elements, the value of which is q and which are located in that portion of said vector which remains on the predefined side relative to the vector position corresponding to the information of quality-of-service class of said data transfer packet.

In a method according to one embodiment of the invention, said basic data is obtained as the output data of a ternary content access memory device (TCAM) by assigning said protocol data as the address data of said ternary content access memory device, and said reduction rule is obtained as the output data of a random access memory device (RAM) by assigning said basic data as the address data of said random access memory device.

In a method according to one embodiment of the invention, said basic data and said reduction rule are obtained as the output data of a ternary content access memory device (TCAM) by assigning said protocol data as the address data of said ternary content access memory device (TCAM).

In a method according to one embodiment of the invention, said basic data is defined using an algorithmic search engine, the input data of which consists of said protocol data, and said reduction rule is obtained as the output data of a random access memory device (RAM) by assigning said basic data as the address data of said random access memory. Said search algorithm can be, for example, a radix-trie, a Patricia-trie, an M-ary trie or the Luleå algorithm.

In a method according to one embodiment of the invention, the sum of said basic data and said auxiliary routing data is calculated, and said routing data is obtained as the output data of a random access memory device (RAM) by giving said sum as the address data of said random access memory.

In a network element according to one embodiment of the invention, the functions of a method according to one or more embodiments of the invention described above are performed by using a computer software, which is stored in a medium readable by one or more processors located in the network element and which comprises the following programmable means:
  programmable means for controlling the network element to define basic data and a reduction rule conforming to the protocol data related to the data transfer packet, the reduction rule being arranged to attach auxiliary data to each quality-of-service class in such a way that the same auxiliary data can be connected to at least two different quality-of-service classes,
  programmable means for controlling said network element to define auxiliary routing data, which consists of auxiliary data corresponding to said reduction rule and the information of quality-of-service class related to this data transfer packet, and
  programmable means for controlling said network element to create routing data based on the interaction of said basic data and said auxiliary routing data.

Said means readable by a processor can be, for example, an optically readable CD-ROM disk (Compact Disk-Read Only Memory), a magnetically readable disk, a computer hard disk, or en electronic central memory unit of a computer.

In a network element according to one embodiment of the invention, part of the above described functions are performed by using application specific integrated circuits (ASIC) designed for a particular function while part of the above described functions are performed using programmable means. The advantage of application specific integrated circuits is a higher execution speed.

As is evident for those skilled in the art, the invention and its embodiments are not limited to the above described exemplifying embodiments but the invention and its embodiments can be modified within the scope of the independent claims.

The invention claimed is:

1. A method of selecting routing data for a data transfer packet that represents one of at least two quality-of-service classes, is associated with information indicating the quality-of-service class represented by said data transfer packet and is related to protocol data associated with a data transfer protocol being used the method comprising:
  using said protocol data as an input quantity for reading from memory devices basic data and a reduction rule that are compatible with a routing table and said protocol data, using said information indicating the quality-of-service class as an input quantity of said reduction rule for obtaining auxiliary routing data, and selecting said routing data on the basis of said basic data and said auxiliary routing data, wherein said reduction rule connects auxiliary data to each quality-of-service class in such a way that each auxiliary data is associated with at least two different quality-of-service classes and said auxiliary routing data is that particular auxiliary data that conforms to said reduction rule and to said information indicating the quality-of-service class.

2. The method according to claim 1, wherein said protocol data is a destination address related to said data transfer packet.

3. The method according to claim 1, wherein said protocol data is a source address related to said data transfer packet.

4. The method according to claim 1, wherein said reduction rule is expressed as a table, which includes auxiliary data corresponding to the different quality-of-service classes and from which said auxiliary routing data is defined by means of a table search using the information of quality-of-service class of said data transfer packet as the table indicator.

5. The method according to claim 1, wherein said reduction rule is expressed as a vector, the value of each element of which is either a predefined constant p or a predefined constant q, and the number of elements of which is the number of different quality-of-service classes, and said auxiliary routing data is defined as follows:

if the value of the element, located in a vector position that corresponds to the information of quality-of-service class of said data transfer packet, is p, said auxiliary routing data is the first predefined auxiliary data value, or if the value of the element, located in a vector position that corresponds to the information of quality-of-service class of said data transfer packet, is q, said auxiliary routing data is the second predefined auxiliary data value increased with the number of elements, the value of which is q and which are located in that portion of said vector which remains on the predefined side relative to the vector position corresponding to the information of quality-of-service class of said data transfer packet.

6. The method according to claim 1, wherein said basic data is obtained as the output data of a ternary content access memory device by assigning said protocol data as the address data of said ternary content access memory device, and reduction rule is obtained as the output data of a random access memory device by assigning said basic data as the address data of said random access memory device.

7. The method according to claim 1, wherein said basic data and said reduction rule are obtained as the output data of a ternary content access memory device by assigning said protocol data as the address data of said ternary content access memory device.

8. The method according to claim 1, wherein said basic data is defined using an algorithmic search engine, the input data of which consists of said protocol data, and said reduction rule is obtained as the output data of a random access memory device by assigning said basic data as the address data of said random access memory.

9. The method according to claim 1, wherein a sum of said basic data and said auxiliary routing data is calculated, and said routing data is obtained as the output data of a random access memory device by giving said sum as the address data of said random access memory.

10. An equipment creating routing data for a data transfer packet that represents one of at least two quality-of-service classes and is associated with information indicating the quality-of-service class represented by said data transfer packet and is related to protocol data associated with a data transfer protocol being used, the equipment comprising circuits arranged to:

use said protocol data as an input quantity for reading from memory devices basic data and a reduction rule that are compatible with a routing table and said protocol data, use said information indicating the quality-of-service class as an input quantity of said reduction rule for obtaining auxiliary routing data, and select said routing data on the basis of said basic data and said auxiliary routing data, wherein said reduction rule is arranged to connect auxiliary data to each quality-of-service class in such a way that each auxiliary data is associated with at least two different quality-of-service classes, and said auxiliary routing data is that particular auxiliary data that conforms to said reduction rule and to said information indicating the quality-of-service class.

11. The equipment according to claim 10, wherein said circuits are arranged to define said basic data and said reduction rule based on the destination address of the data transfer packet.

12. The equipment according to claim 10, wherein said circuits are arranged to define said basic data and said reduction rule based on the source address of the data transfer packet.

13. The equipment according to claim 10, wherein said circuits are arranged to define said reduction rule as a table, which contains auxiliary data conforming to the different quality-of-service classes, and said circuits are arranged to perform a table search using the information of quality-of-service class of said data transfer packet as the table indicator.

14. The equipment according to claim 10, wherein said circuits are arranged to define said reduction rule as a vector, the value of each element of which is either a predefined constant p or a predefined constant q, and the number of elements of which is the number of the different quality-of-service classes, and said circuits comprise a logic-arithmetical unit for determining said auxiliary routing data according to the following rule:

if the value of the element, located in a vector position that corresponds to the information of quality-of-service class of said data transfer packet, is p, said auxiliary routing data is the first predefined auxiliary data value, or if the value of the element, located in a vector position corresponding to the information of quality-of-service class of said data transfer packet, is q, said auxiliary routing data is the second predefined auxiliary data value increased with the number of elements, the value of which is q and which are located in that portion of said vector which remains on the predefined side relative to the position corresponding to the information of quality-of-service class of said data transfer packet.

15. The equipment according to claim 10, wherein said circuits comprise a ternary content access memory device, a circuit for assigning said protocol data as the address data of said ternary content access memory device, a circuit for reading said basic data from the output of said ternary content access memory device, a random access memory device, a circuit for assigning said basic data as the address data of said random access memory device, and a circuit for reading said reduction rule from the output of said random access memory device.

16. The equipment according to claim 10, wherein said circuits comprise a ternary content access memory device, a circuit for assigning said protocol data as the address data of said ternary content access memory device, a circuit for reading said basic data and said reduction rule from the output of said ternary content access memory device.

17. The equipment according to claim 10, wherein said circuits comprise a circuit for defining said basic data with an algorithmic search engine using said protocol data as the input data of said algorithmic search engine, a random access memory device, a circuit for assigning said basic data as the address data of said random access memory device, and a circuit for reading said reduction rule from the output of said random access memory device.

18. The equipment according to claim 10, wherein said circuits have a summation element for calculating the sum of said basic data and said auxiliary routing data, a random access memory device, a circuit for assigning said sum as the address data of said random access memory device, and a circuit for reading said routing data from the output of said random access memory device.

19. A network element for controlling traffic of data transfer packets, each data transfer packet representing one of at least two quality-of-service classes and being associated with information indicating the quality-of-service class represented by said data transfer packet the network element comprising circuits arranged to:
use an destination address related to an arrived data transfer packet as an input quantity for reading from memory devices basic data and a reduction rule that are compatible with a routing table and said destination address,
use information indicating the quality-of-service class represented by said arrived data transfer packet as an input quantity of said reduction rule for obtaining auxiliary routing data,
select routing data conforming to said destination address on the basis of said basic data and said auxiliary routing data select one or more output links based on the routing data corresponding to said destination address, and
send information corresponding to said arrived data transfer packet to the selected on or more output links,
wherein said reduction rule is arranged to connect auxiliary data to each quality-of-service class in such a way that each auxiliary data is associated with at least two different quality-of-service classes, and said auxiliary routing data is that particular auxiliary data that conforms to said reduction rule and to said information indicating the quality-of-service class.

20. A network element according to claim 19, wherein the circuits are further arranged to:
use a source address related to said arrived data transfer packet as an input quantity for reading from the memory devices second basic data and a second reduction rule that is compatible with the routing table and said source address,
use the information indicating the quality-of-service class represented by said arrived data transfer packet as an input quantity of said second reduction rule for obtaining second auxiliary routing data,
obtain second routing data conforming to said source address on the basis of said second basic data and said second auxiliary routing data, and
enable or disable the delivery of said arrived data transfer packet based on the second routing data corresponding to said source address.

21. A search module for obtaining routing data for a data transfer packet that represents one of at least two quality-of-service classes is associated with information indicating the quality-of-service class represented by said data transfer packet and is related to protocol data associated with a data transfer protocol being used, the search module comprising:
an input interface for receiving the protocol data and the information of quality-of-service class of said data transfer packet,
an output interface for transferring the routing data obtained for said data transfer packet to outside the search module, and
circuits arranged to:
use the protocol data as an input quantity for reading from memory devices basic data and a reduction rule that are compatible with a routing table and the protocol data,
use said information indicating the quality-of-service class as an input quantity of said reduction rule for obtaining auxiliary routing data, and
select said routing data on the basis of said basic data and said auxiliary routing data,
wherein said reduction rule is arranged to connect auxiliary data to each quality-of-service class in such a way that each auxiliary data is associated with at least two different quality-of-service classes and said auxiliary routing data is that particular auxiliary data that conforms to said reduction rule and to said Information indicating the quality-of-service class.

22. The search module according to claim 21, wherein said circuits comprise a ternary content access memory device, a circuit for assigning said protocol data as the address data of said ternary content access memory device, a circuit for reading said basic data from the output of said ternary content access memory device, a random access memory device, a circuit for assigning said basic data as the address data of said random access memory device, and a circuit for reading said reduction rule from the output of said random access memory device.

23. The search module according to claim 21, wherein said circuits comprise a ternary content access memory device, a circuit for assigning said protocol data as the address data of said ternary content access memory device, and a circuit for reading said basic data and said reduction rule from the output of said ternary content access memory device.

24. The search module according to claim 21, wherein said circuit comprise a circuit for defining said basic data with an algorithmic search engine using said protocol data as the input data of said algorithmic search engine, a random access memory device, a circuit for assigning said basic data as the address data of said random access memory device, and a circuit for reading said reduction rule from the output of said random access memory device.

25. The search module according to claim 21, wherein said circuits comprise a summation element for calculating a sum of said basic data and said auxiliary routing data, a random access memory device, a circuit for assigning said sum as the address data of said random access memory device, and a circuit for reading said routing data from the output of said random access memory device.

26. A non-transitory computer readable storage medium with a computer program stored thereon for selecting routing data for a data transfer packet that represents one of at least two quality-of-service classes, is associated with information indicating the quality-of-service class represented by said data transfer packet, and is related to protocol data that is associated with a data transfer protocol being used, the computer program when executed by a processor comprising:

using the protocol data as an input quantity for reading from memory devices basic data and a reduction rule that are compatible with a routing table and the protocol data, using said information indicating the quality-of-service class as an input quantity of said reduction rule for obtaining auxiliary routing data, and selecting said routing data on the basis of said basic data and said auxiliary routing data, wherein said reduction rule is arranged to connect auxiliary data to each quality-of-service class in such a way that each auxiliary data is associated with at least two different quality-of-service classes and said auxiliary routing data is that particular auxiliary data that conforms to said reduction rule and to said information indicating the quality-of-service class.

\* \* \* \* \*